United States Patent
Palanisamy

(10) Patent No.: US 10,417,003 B1
(45) Date of Patent: Sep. 17, 2019

(54) DATA UNIT SYNCHRONIZATION BETWEEN CHAINED PIPELINES

(71) Applicant: Ambarella, Inc., Santa Clara, CA (US)

(72) Inventor: Kumarasamy Palanisamy, San Jose, CA (US)

(73) Assignee: Ambarella, Inc., Santa Clara, CA (US)

( * ) Notice: Subject to any disclaimer, the term of this patent is extended or adjusted under 35 U.S.C. 154(b) by 526 days.

(21) Appl. No.: 14/840,311

(22) Filed: Aug. 31, 2015

(51) Int. Cl.
*G06F 9/38* (2018.01)
*G06F 9/30* (2018.01)

(52) U.S. Cl.
CPC ........ *G06F 9/3867* (2013.01); *G06F 9/30145* (2013.01)

(58) Field of Classification Search
CPC .. H04N 5/23241; H04N 5/23225; G06F 9/52; G06F 9/3867
See application file for complete search history.

(56) References Cited

U.S. PATENT DOCUMENTS

| | | | | |
|---|---|---|---|---|
| 4,580,134 A * | 4/1986 | Campbell | ................ | G09G 5/06 345/589 |
| 5,675,750 A * | 10/1997 | Matsumoto | ......... | G06F 12/1027 710/200 |
| 5,926,227 A * | 7/1999 | Schoner | ........... | H04N 21/23406 348/512 |
| 6,072,548 A * | 6/2000 | Schoner | .................... | G06T 1/60 345/520 |
| 6,078,361 A * | 6/2000 | Reddy | ................... | G06F 3/1475 345/213 |
| 6,536,029 B1 * | 3/2003 | Boggs | .................. | G05B 19/054 716/117 |
| 6,594,529 B1 * | 7/2003 | Boggs | ................ | G05B 19/0423 365/189.05 |
| 2001/0037491 A1 * | 11/2001 | Boggs | ..................... | G06F 1/025 717/128 |
| 2011/0119673 A1 * | 5/2011 | Bloch | ..................... | G06F 9/546 718/102 |
| 2011/0129198 A1 * | 6/2011 | Toma | ................. | G11B 27/3027 386/239 |
| 2011/0235459 A1 * | 9/2011 | Ware | ........................ | G11C 7/04 365/233.11 |
| 2012/0030451 A1 * | 2/2012 | Pong | ..................... | H03M 13/09 712/223 |
| 2014/0376569 A1 * | 12/2014 | Philip | ........................ | G06F 1/04 370/503 |

* cited by examiner

*Primary Examiner* — Getente A Yimer
(74) *Attorney, Agent, or Firm* — Christopher P. Maiorana, PC

(57) ABSTRACT

An apparatus having an interface and a circuit is disclosed. The interface may be connectable to a plurality of counters and a plurality of chained pipelines. The circuit may be configured to (i) increment each of a plurality of counters associated with a data unit in a buffer in response to a request from a first pipeline of the chained pipelines to increment one of the counters. The first pipeline may generate the data unit in the buffer. A plurality of second pipelines of the chained pipelines may access the data in the buffer in response to the counters being incremented. The circuit may be further configured to (ii) receive a plurality of wake instructions from the counters and (iii) send another wake instruction to the first pipeline in response to reception of all of the wake instructions.

15 Claims, 9 Drawing Sheets

US 10,417,003 B1

DATA UNIT SYNCHRONIZATION BETWEEN CHAINED PIPELINES

This application relates to co-pending U.S. application Ser. No. 14/831,187, filed Aug. 20, 2015, which is incorporated by reference in its entirety.

FIELD OF THE INVENTION

The present invention relates to pipelined processors generally and, more particularly, to data unit synchronization between chained pipelines.

BACKGROUND OF THE INVENTION

Conventional high quality and high performance video camera systems implement several image and video processor pipeline sections, each with several input streams and output streams. For low latency applications, an output stream from a pipeline section feeds to an input stream of another pipeline section through an on-chip stream buffer without going through an off-chip memory. The streams are synchronized though one-to-one semaphore counter operations. The pipeline that produces the output stream performs an increment-wait operation on a counter after storing a specified amount data in a stream buffer channel. The pipeline that consumes the output stream initially performs a receive-wait operation and a subsequent decrement operation on the counter after consuming the same amount of data.

It would be desirable to implement data unit synchronization between chained pipelines.

SUMMARY OF THE INVENTION

The present invention concerns an apparatus having an interface and a circuit. The interface may be connectable to a plurality of counters and a plurality of chained pipelines. The circuit may be configured to (i) increment each of a plurality of counters associated with a data unit in a buffer in response to a request from a first pipeline of the chained pipelines to increment one of the counters. The first pipeline may generate the data unit in the buffer. A plurality of second pipelines of the chained pipelines may access the data in the buffer in response to the counters being incremented. The circuit may be further configured to (ii) receive a plurality of wake instructions from the counters, (iii) send another wake instruction to the first pipeline in response to reception of all of the wake instructions.

The objects, features and advantages of the present invention include providing data unit synchronization between chained pipelines that may (i) synchronize the data feeds from a producer pipeline to consumer pipelines, (ii) work with existing camera architectures, (iii) scale to any number of pipelines, (iv) be reconfigurable, (v) free a processor from monitoring data unit processing by the pipelines, (vi) allow the pipelines to share data units with varying skews with respect to each other, (vii) be transparent to the pipelines that produce and consume the data, (viii) allow the pipelines to daisy chain to each other and/or (ix) be implemented as part of a digital camera.

BRIEF DESCRIPTION OF THE DRAWINGS

These and other objects, features and advantages of the present invention will be apparent from the following detailed description and the appended claims and drawings in which:

DETAILED DESCRIPTION OF EMBODIMENTS

Embodiments of the present invention generally provide a reconfigurable autonomous hardware synchronization virtualization circuit that synchronizes a producer pipeline to multiple consumer pipelines executing video stream applications in an efficient, flexible, and transparent way. The synchronization virtualization agent may reside between an image processor core and a synchronization counter unit such that all the synchronization counter operation requests and wake instructions between the image processor pipelines and the counter unit pass through the synchronization virtualization circuit via a shared bus.

When enabled, the synchronization virtualization circuit generally snoops the shared bus and grabs any synchronization counter increment-wait requests that match a programmed synchronization identification value. The circuit may translate the single increment-wait request into one or more counter increment-wait operations. The counter increment-wait operations may program one or more destination counters. The circuit may return a single final wake instruction back to the originally requesting pipeline after the increment-wake operations are performed on all of the destination counters and wake instructions are received from the corresponding destination counters.

Figure 1:
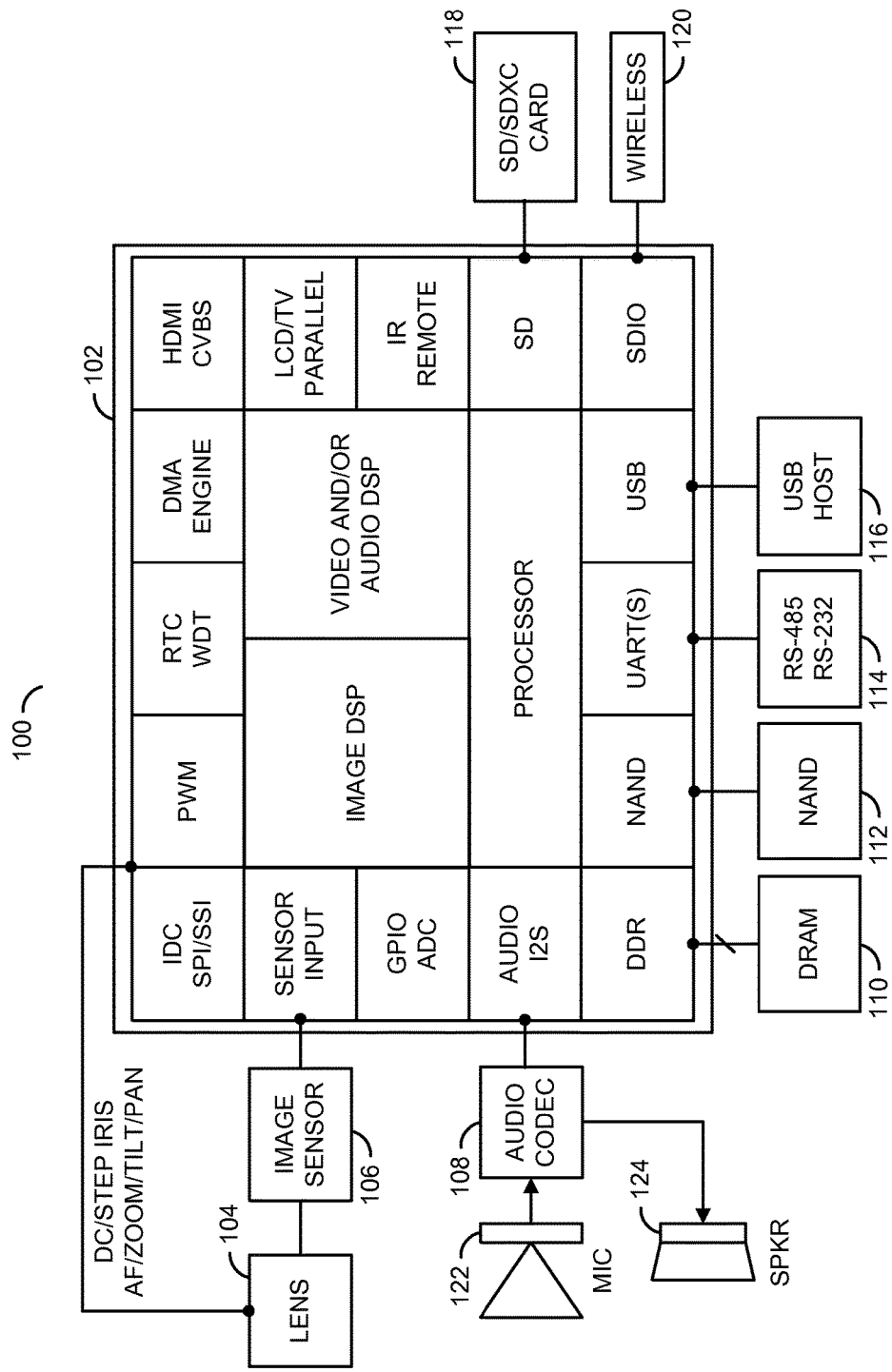
FIG. 1 is a block diagram of a camera system.

Referring to FIG. 1, a block diagram of a camera system 100 is shown illustrating an example implementation of a camera/recorder system (or apparatus). In some embodiments, the camera system 100 may be a digital video camera, a digital still camera or a hybrid digital video/still camera. In an example, the electronics of the camera system 100 may be implemented as one or more integrated circuits. For example, an application specific integrated circuit (e.g., ASIC) or system-on-a-chip (e.g., SOC) may be used to implement a processing portion of the camera system 100. In various embodiments, the camera system 100 may comprise a camera chip (or circuit) 102, a lens assembly 104, an image sensor 106, an audio codec 108, dynamic random access memory (e.g., DRAM) 110, nonvolatile memory (e.g., NAND flash memory, NOR flash memory, etc.) 112, one or more serial interfaces 114, an interface 116 for connecting to or acting as a universal serial bus (e.g., USB) host, an interface for connecting to a removable media 118 (e.g., SD—secure digital media, SDXC—secure digital extended capacity media, etc.), a wireless interface 120 for communicating with a portable user device, a microphone 122 for recording audio, and a speaker 124 for playing audio. In some embodiments, the lens assembly 104 and the image sensor 106 may be part of a separate camera connected to the processing portion of the system 100 (e.g., via a video cable, a high definition media interface (e.g., HDMI) cable, a USB cable, an Ethernet cable, or wireless link).

In various embodiments, the circuit 102 may comprise a number of modules (or circuits) including, but not limited to, a pulse width modulation (e.g., PWM) module, a real time clock and watchdog timer (e.g., RTC/WDT), a direct memory access (e.g., DMA) engine, a high-definition multimedia interface (e.g., HDMI), an LCD/TV/Parallel interface, a general purpose input/output (e.g., GPIO) and an analog-to-digital converter (e.g., ADC) module, an infrared (e.g., IR) remote interface, a secure digital input output (e.g., SDIO) interface module, a secure digital (e.g., SD) card interface, an audio inter-IC sound (e.g., I2S) interface, an image sensor input interface, and a synchronous data communications interface (e.g., IDC SPI/SSI). The circuit 102 may also include an embedded processor (e.g., ARM, etc.), an image digital signal processor (e.g., DSP), and a video and/or audio DSP. In embodiments incorporating the lens assembly 104 and image sensor 106 in the system 100, the circuit 102 may be configured (e.g., programmed) to control the lens assembly 104 and receive image data from the sensor 106. The wireless interface 120 may include support for wireless communication by one or more wireless protocols such as Bluetooth®, ZigBee®, Institute of Electrical and Electronics Engineering (e.g., IEEE) 802.11, IEEE 802.15, IEEE 802.15.1, IEEE 802.15.2, IEEE 802.15.3, IEEE 802.15.4, IEEE 802.15.5, and/or IEEE 802.20. The circuit 102 may also include support for communicating using one or more of the universal serial bus protocols (e.g., USB 1.0, 2.0, 3.0, etc.). The circuit 102 may also be configured to be powered via the USB connection. However, other communication and/or power interfaces may be implemented accordingly to meet the design criteria of a particular implementation.

In various embodiments, programming code (e.g., executable instructions for controlling various processors and encoders of the circuit 102) may be stored in one or more of the memories 110 and 112. When executed by the circuit 102, the programming code generally causes one or more processors in the circuit 102 to configure synchronization virtualization agents and start video frame processing operations. The resulting compressed video signal may be presented to the SD/SDXC card 118, and/or the wireless interface 120, and/or the USB interface 116.

Figure 2:
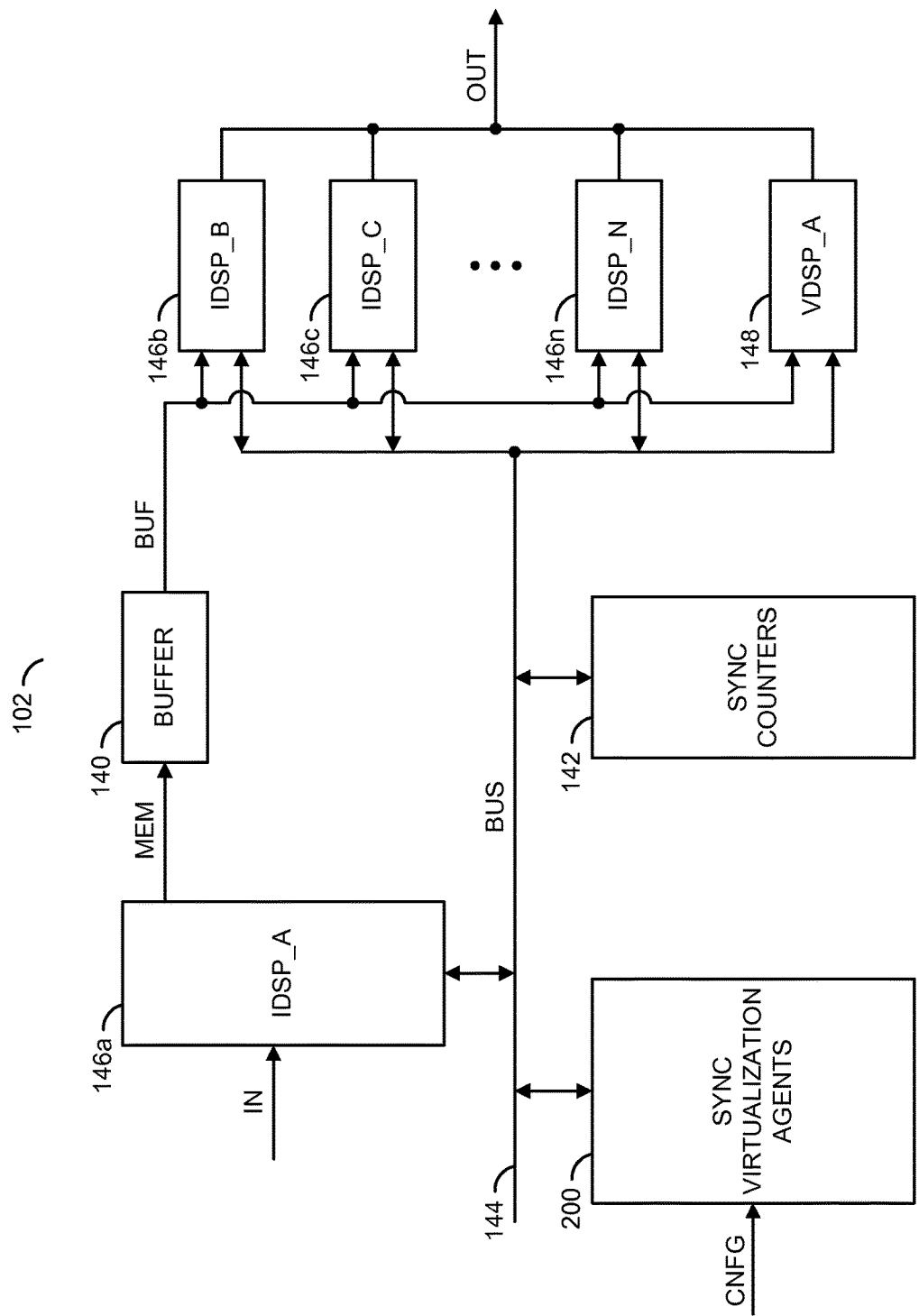
FIG. 2 is a block diagram of a portion of a camera chip in accordance with a preferred embodiment of the present invention.

Referring to FIG. 2, a block diagram of a portion of the circuit 102 is shown in accordance with a preferred embodiment of the present invention. The circuit 102 generally comprises a block (or circuit) 140, a block (or circuit) 142, a channel (or bus) 144, multiple blocks (or circuits) 146a-146n, one or more blocks (or circuits) 148 and a block (or circuit) 200. The circuits 140-148 and 200 may be implemented in hardware, software, firmware or any combination thereof in an apparatus (or device).

A signal (e.g., CNFG) may be received by the circuit 200. The signal CNFG may carry configuration information to configure the circuit 200. A signal (e.g., MEM) may be generated by the circuit 146a and received by the circuit 140. The signal MEM may convey data between the circuit 146a and the circuit 140. The circuit 140 may generate a signal (e.g., BUF) transferred to the circuits 146b-146n and/or the circuits 148. The signal BUF generally presents buffered data from the circuit 140 to the circuits 146b-146n and/or 148. A signal (e.g., IN) may be received by the circuit 146a. A signal (e.g., OUT) may be generated and presented by one or more of the circuits 146b-146n and 148.

The circuit 140 may implement a buffer circuit. The circuit 140 is generally operational to buffer video pictures (e.g., images, frames, fields) received from the memory 110 and one or more of the circuits 146a-146n and consumed by the circuits 146a-146n and 148. A size of the circuit 140 is generally designed to hold multiple data units concurrently.

The circuit 142 may implement a synchronization counter circuit. The circuit 142 is generally operational to run multiple counters in parallel and independently of each other. Each counter may be used to track the status of a respective pipeline processing a data unit buffered in the circuit 140. While the counter has a "busy" value (e.g., a non-zero value), the corresponding data unit is still being processed by the respective pipeline. Once all of the counters associated with a data unit have a "done" value (e.g., a zero value), all of the circuits 146b-146n and 148 may be finished with the data unit and the space may be recycled in the circuit 140.

The bus 144 may implement a shared communication bus. The bus 144 is generally operational to transfer commands, requests and other signals among the circuits 142, 146a-146n, 148 and 200. In various embodiments, the bus 144 may be implemented as a single bidirectional bus. In other embodiments, the bus 144 may be implemented as multiple buses.

The circuits 146a-146n may implement multiple image digital signal processor (e.g., IDSP) pipeline sections. The pipelines 146a-146n may be part of the image DSP shown in FIG. 1. Each pipeline 146a-146n may be operational to process the data units stored in the circuit 140. One or more of the pipelines 146a-146n (e.g., pipeline 146a) may be chained to the other pipelines 146b-146n and/or 148 through the bus 144, the circuit 142 and the circuit 200. The pipeline 146a may be a producer of the data consumed by the pipelines 146b-146n and/or 148. The processed data may be presented in the signal OUT. In some embodiments, each pipeline 146a-146n may be implemented as a hardware pipeline. In other embodiments, each pipeline 146a-146n may be implemented as a software pipeline. Other designs of the pipelines 146a-146n may be implemented to meet the design criteria of a particular application.

The circuits 148 (a single circuit shown) may implement a video digital signal processor (e.g., VDSP) pipeline. The pipelines 148 may be part of the video DSP shown in FIG. 1. The pipelines 148 may be operational to process the data units stored in the circuit 140. The processed data may be presented in the signal OUT. In some embodiments, the pipelines 148 may be implemented as hardware pipelines. In other embodiments, the pipelines 148 may be implemented as software pipelines. Other designs of the pipelines 148 may be implemented to meet the design criteria of a particular application.

The circuit 200 may implement the synchronization virtualization circuit. The circuit 200 is generally operational to function as one or more virtualization agents that synchronize the presentation of data units in the circuit 140 to the pipelines 146b-146n and/or 148 for consumption. The circuit 200 generally controls one or more parallel streams of data units from one or more of the producer pipelines 146a-146n (e.g., the pipeline 146a), through the circuit 140 and to the consuming pipelines 146b-146n and/or 148. In various embodiments, the circuit 200 may be implemented only in hardware.

Figure 3:
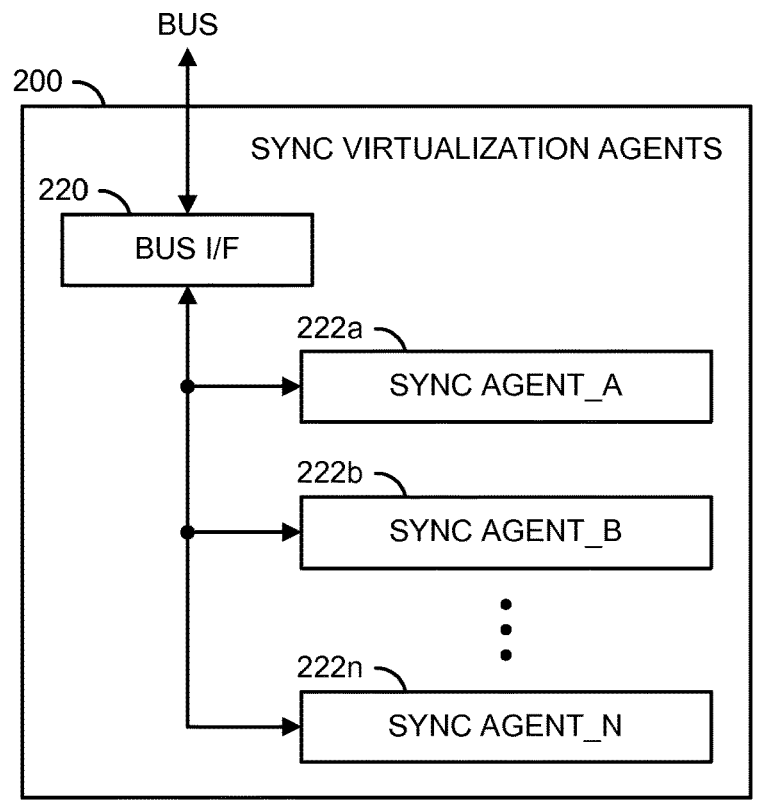
FIG. 3 is a block diagram of a synchronization virtualization circuit.

Referring to FIG. 3, a block diagram of an example implementation of the circuit 200 is shown. The circuit (or apparatus) 200 generally comprises a block (or circuit) 220 and multiple blocks (or circuits) 222a-222n. The circuits 220-222n may be implemented in hardware, software, firmware or any combination thereof in an apparatus (or device). In various embodiments, the circuits 220-222n may be implemented only in hardware.

The circuit 220 may implement a bus interface circuit. The circuit 220 is generally operational to communicate over the bus 144 with the circuit 142 and the pipelines 146a-146n and/or 148. In some embodiments, the circuit 220 may include registers used to configure the circuit 200.

The circuits 222a-222n may implement synchronization agent circuits. Each circuit 222a-222n may be configured to control a stream of data units from the producer pipeline 146a, through the circuit 140, and to the consumer pipelines 146b-146n and/or 148. Adjustable configuration parameters of the circuits 222a-222n may include, but are not limited to, identification values, multiple enable bits, and multiple synchronization counter numbers associated the pipelines 146a-146n and 148. Additional details regarding the circuit 200 may be found in co-pending U.S. application Ser. No. 14/831,187, filed Aug. 20, 2015, which is incorporated by reference in its entirety.

Figure 4:
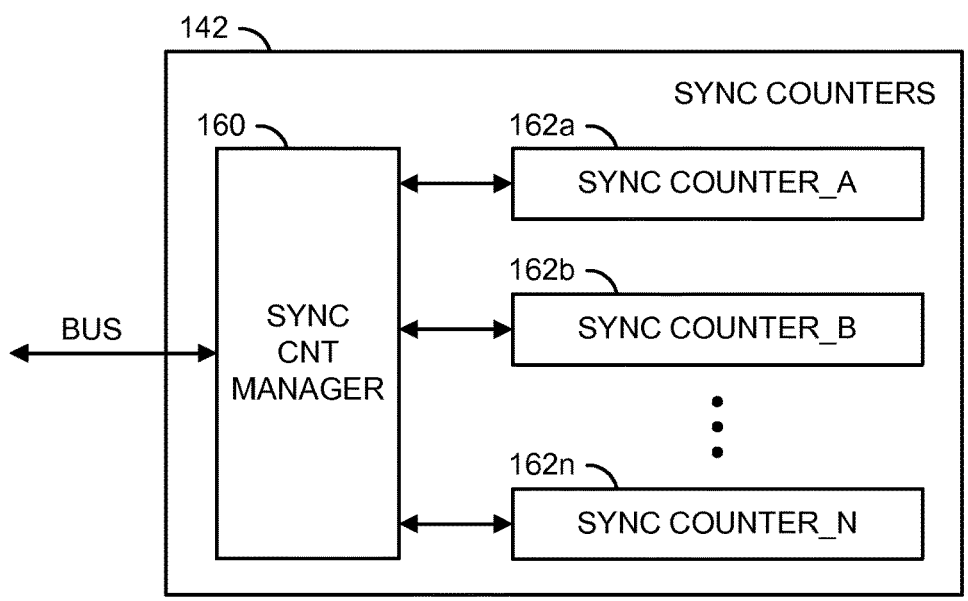
FIG. 4 is a block diagram of a counter circuit.

Referring to FIG. 4, a block diagram of an example implementation of the circuit 142 is shown. The circuit 142 generally comprises a block (or circuit) 160 and multiple blocks (or circuits) 162a-162n. The circuits 160-162n may be implemented in hardware, software, firmware or any combination thereof in an apparatus (or device).

The circuit 160 may implement a synchronization counter manager circuit. The circuit 160 is generally operational to communicate over the bus 144 with the circuit 200 and the pipelines 146a-146n and/or 148. The circuit 160 may be operational to program, increment, decrement and reset counters in the circuits 162a-162n.

The circuits 162a-162n may implement synchronization counter circuits. Each circuit 162a-162n is generally operational to count up and down based on commands received from the circuit 160. Each circuit 162a-162n may also be configured to accept an initial count value other than zero. Each circuit 162a-162n may be individually programmable (e.g., by the embedded software) with a maximum count value (e.g., usually a unit (one) less than the number of allocated buffer units).

Whenever the manager circuit 160 receives an increment-wait request (or message) from the circuit 200 for a selected counter circuit 162a-162n, the circuit 160 initially checks whether the increment-wait request would cause the selected counter circuit 162a-162n to exceed the programmed maximum value. If the manager circuit 160 determines that the increment may not result in the selected counter circuit 162a-162n exceeding the programmed maximum value, the selected counter circuit 162a-162n may be allowed to perform the increment operation and return the wake instruction to the corresponding requester circuit 222a-222n. Otherwise the increment-wait request may be put in a pending/wait state and the wake instruction (or message) may be delayed until the above condition is satisfied.

A corresponding pipeline 146a-146n and 148 may send one or more decrement requests (or messages) to the selected counter circuit 162a-162n causing the counter value to decrease such that the pending increment may not cause the counter value to exceed the programmed maximum value. The increment-wait request in the wait state generally does not block any decrement requests (e.g., usually from a consuming pipeline section/input stream) from performing the decrement operation. The selected counter circuit 162a-162n may return a wake instruction for the increment-wait request to the corresponding requester in the circuit 200 after completing the increment operation.

Whenever a given counter circuit 162a-162n receives a receive-wait request (or message), the manager circuit 160 may check whether the count value of the given counter circuit 162a-162n is greater than (e.g., usually >0) the value specified in the request. In various embodiments, a default value in the request may be zero. If the given counter value is greater than the value specified in the request, the given counter circuit 162a-162n may return the wake instruction back to the requester. Otherwise, the receive-wait request may be put in a pending/wait state until the circuit 200 performs one or more increment-wait requests on the given counter circuit 162a-162n such that the given counter value becomes greater than the requested value. When the given counter value becomes greater than the requested value, the given counter circuit 162a-162n may return a wake instruction back to the requester (e.g., usually an input stream of a section pipeline). In some embodiments, the default value specified in the receive-wait requests may be zero. Hence, the given counter circuit 162a-162n generally returns the wake instruction as soon as the counter value becomes greater than zero.

The decrement requests generally result in a decrement of the counter value where the counter value is greater than zero. If the decrement request would result in the counter value to be less than zero, the counter value may be floored at the minimum value (e.g., zero). In various embodiments, the counter value may never become negative.

Figure 5:
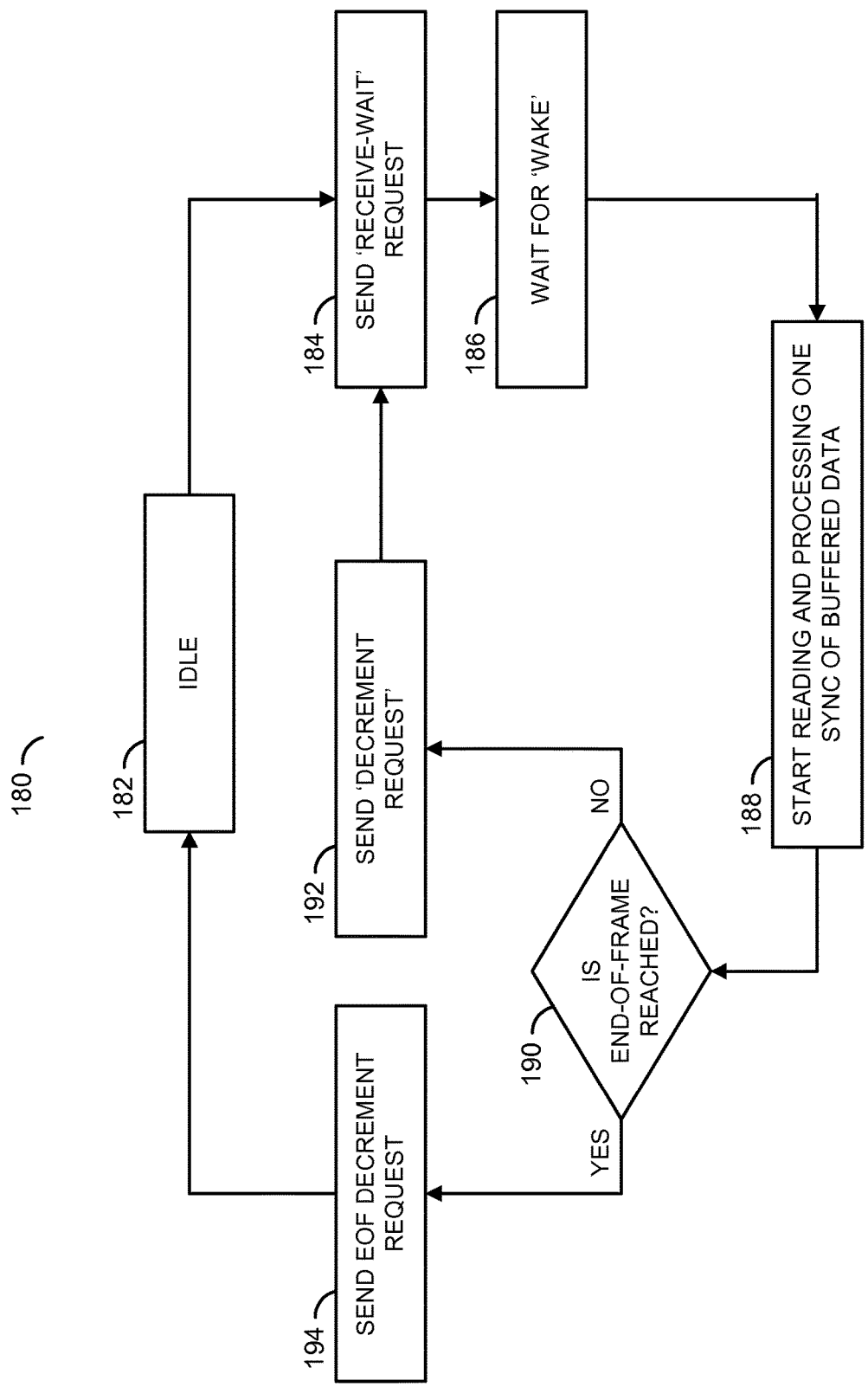
FIG. 5 is a flow diagram of a pipeline operation.

Referring to FIG. 5, a functional flow diagram of an example pipeline method of operation 180 is shown. The method 180 may be implemented in each of the pipelines 146a-146n and 148. The method (or process) 180 generally comprises a step (or state) 182, a step (or state) 184, a step (or state) 186, a step (or state) 188, a decision step (or state) 190, a step (or state) 192 and a step (or state) 194. The steps 182-194 may be implemented in hardware, software, firmware or any combination thereof in an apparatus (or device).

In the step 182, a target pipeline (e.g., 146d) among the pipelines 146a-146n and 148 may start in an idle state. When commanded to process data, the target pipeline 146d may send a receive-wait request in the step 184 to the corresponding counter circuit 162a-162n. In the step 186, the target pipeline 146d may wait for the wake instruction from the corresponding counter circuit 162a-162n.

Upon receiving the wake instruction, the target pipeline 146d may begin reading a unit of buffered data from the circuit 140 and process the unit. If the unit is determined not to be at an end-of-frame position in the decision step 190, the target pipeline 146d may send a decrement request on the bus 144 in the step 192. Thereafter, the target pipeline 146d may send another receive-wait request in the step 184. The loop around the steps 184-192 may continue until an end-of-frame is detected in the decision step 190. The target pipeline 146d may send an end-of-frame decrement request in the step 194. Afterwards, the target pipeline 146d generally returns to the idle state in the step 182 and idles processing operations.

Figure 6:
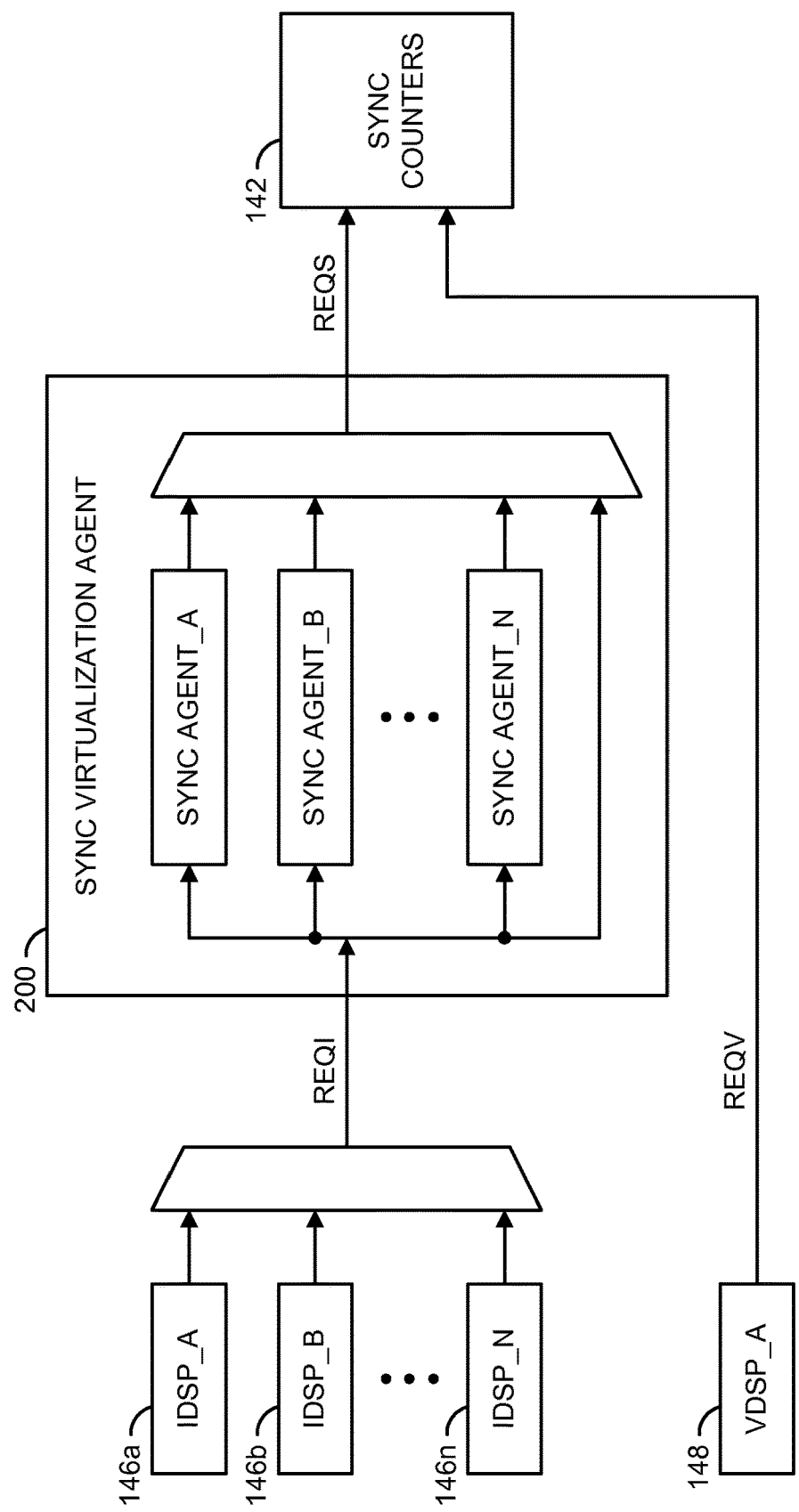
FIG. 6 is a functional flow diagram of a snooping operation.

Referring to FIG. 6, a functional flow diagram of an example snooping operation of the circuit 200 is shown. In various embodiments of the present invention, the software may configure one or more producer pipelines 146a-146n (e.g., the pipeline 146a) to use a dedicated semaphore/synchronization counter in the circuit 142 to synchronize the output data. The producer pipeline 146a generally processes the new data units from the circuit 140 and returns processed data units to the circuit 140. Furthermore, the software generally configures each input stream of the target pipelines 146a-146n (e.g., the pipelines 146b-146d) to use a dedicated semaphore/synchronization counter in the circuit 142 to synchronize the input data.

The circuit 200 generally resides between the image processor core and the counter circuit 142 on the bus 144. As such, all synchronization counter operation requests in the signals REQI and REQS and wake instructions between the image processor pipelines 146a-146n and circuit 142 may pass through the circuit 200. When enabled, one or more of the circuits 222a-222n may snoop the bus 144 in search of synchronization operation requests in the form of increment-wait requests that matches the programmed synchronization identification value of the circuit 222a-222n (e.g., the circuit 222a). When a matching synchronization counter operation is detected on the bus 144, the matching circuit 222a may grab the matching increment-wait request and translate the single synchronization counter increment-wait request into one or more synchronization counter increment-wait requests to the programmed counter circuits 162a-162n. The matching circuit 222a generally returns a single final wake instruction back to the originally requested producer pipeline 146a after the increment-wake operation is performed on all of the programmed destination counters 162a-162n and the wake instructions are received from the corresponding circuits 162a-162n

The target pipelines 146b-146n that process (or consume) the data units may issue the receive-wait requests to the circuit 200 in the signal REQI. The circuit 200 may relay the receive-wait requests to the target circuits 162b-162n in the signal REQS. The target pipelines 146b-146n may wait until the target circuits 162b-162n return the wake instructions (or signals) before processing a new unit of data from the circuit 140.

The decrement requests are generally transferred via the bus 144 to the target circuits 162b-162n (the counters linked with the respective target pipelines 146b-146n that consume the data). The the decrement requests may be transferred to the target circuits 162b-162n in the signal REQS.

An increment-wait request generally causes a circuit 162a-162n to be incremented by a unit value (e.g., typically 1) to show that new data is available in the circuit 140. The incrementing may reach a wait condition when the count value reaches a maximum value. A decrement request generally causes the counter value to be reduced by a unit value because an existing data unit has been consumed and the circuit 140 is free to reuse the space occupied by that data unit. A new receive-wait request may be issued by a consuming target pipeline 146b-146n whenever the consuming target pipeline wants to read/consume the next data unit (e.g., next data buffer). The new receive-wait request may be issued as soon as the decrement request is issued for the previous data. The target pipelines 146b-146n may wait after issuing the receive-wait commands until the wake instructions are returned. The receiving counters 162b-162n may check the values specified in the receive-wait requests (e.g., usually zero) and return the wake instructions back to the requesting target pipelines 146b-146n as soon as the corresponding counter values are greater (e.g., usually one) than the value specified in the receive-wait request. Upon receiving the wake instructions, the target pipelines 146b-146n may infer that the corresponding counter values are greater than zero or the specified value in the receive-wait requests. Therefore, the requested data units may be already available in the circuit 140.

The circuit 200 is generally transparent to the pipelines 146a-146n and 148 and the circuit 142. The pipelines 146a-146n and the circuit 142 may operate as if the streams are connected one-to-one through dedicated buffers. Therefore, the circuit 200 may be transparent to the pipeline 146a producing the output stream whether the output stream is feeding a single pipeline (e.g., 146g) or multiple pipelines 146b-146n. Similarly, the circuit 200 is generally transparent to the pipelines 146b-146n whether the input stream is being shared with other pipelines 146b-146n or not. Each pipeline 146b-146n that receives/consumes the output stream may work as if receiving the data alone from the producer pipeline 146a.

Figure 7:
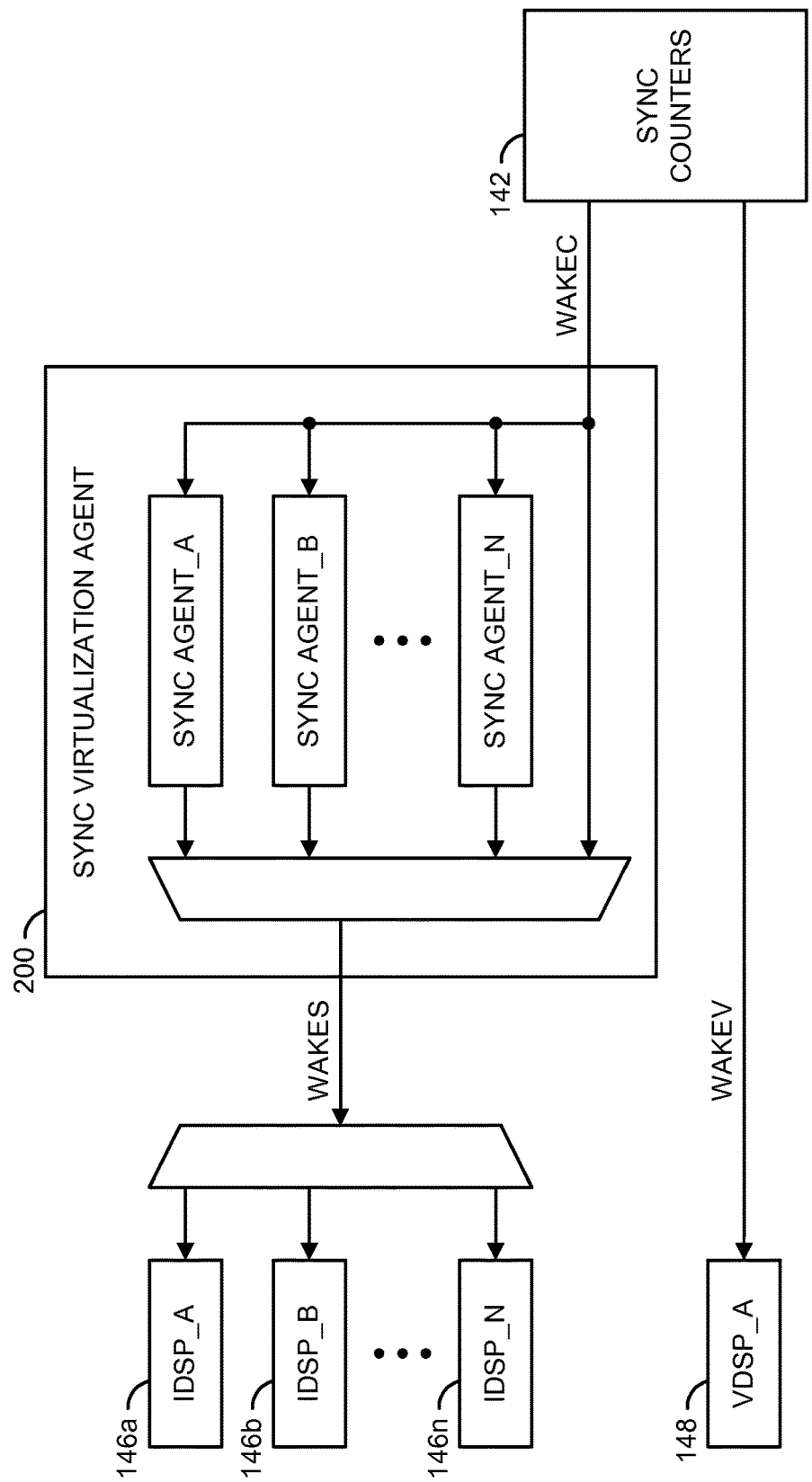
FIG. 7 is a functional flow diagram of a wake operation.

Referring to FIG. 7, a functional flow diagram of an example wake operation of the circuit 200 is shown. The circuit 142 may generate the wake instructions (or signals) when the corresponding counter value becomes greater than or matches the amount specified in the request (e.g., usually a single data unit amount). The wake instructions may be received by the circuit 200 either at different times or simultaneously. The wake instructions may be presented on the bus 144 to the circuit 200 in a signal (e.g., WAKEC). The circuit 200 generally relays the wake instructions to the requesting pipelines 146a-146n in a signal (e.g., WAKES) via the bus 144. The wake instructions in the signal WAKEV may be presented to the pipelines 148.

The wake instructions from the circuit 142 may guarantee that one or more of the requested synchronization unit amounts of data are available in the circuit 140 for the requesting pipelines 146b-146n to access. Once the requesting pipelines 146b-146n receive the wake instruction signals, the requesting pipelines 146b-146n may start reading and processing the data from the circuit 140. The requesting pipelines 146b-146n may perform a decrement request after processing a synchronization unit amount of input data from the circuit 140.

All input stream channels of the target pipelines 146b-146n that share the same input data unit may be configured to point to a stream channel in the circuit 140. The producer pipeline 146a may be programmed to fetch data from the on-chip buffer circuit 140. The consumer pipelines 146b-146n and/or 148 may read the data from the circuit 140.

Figure 8:
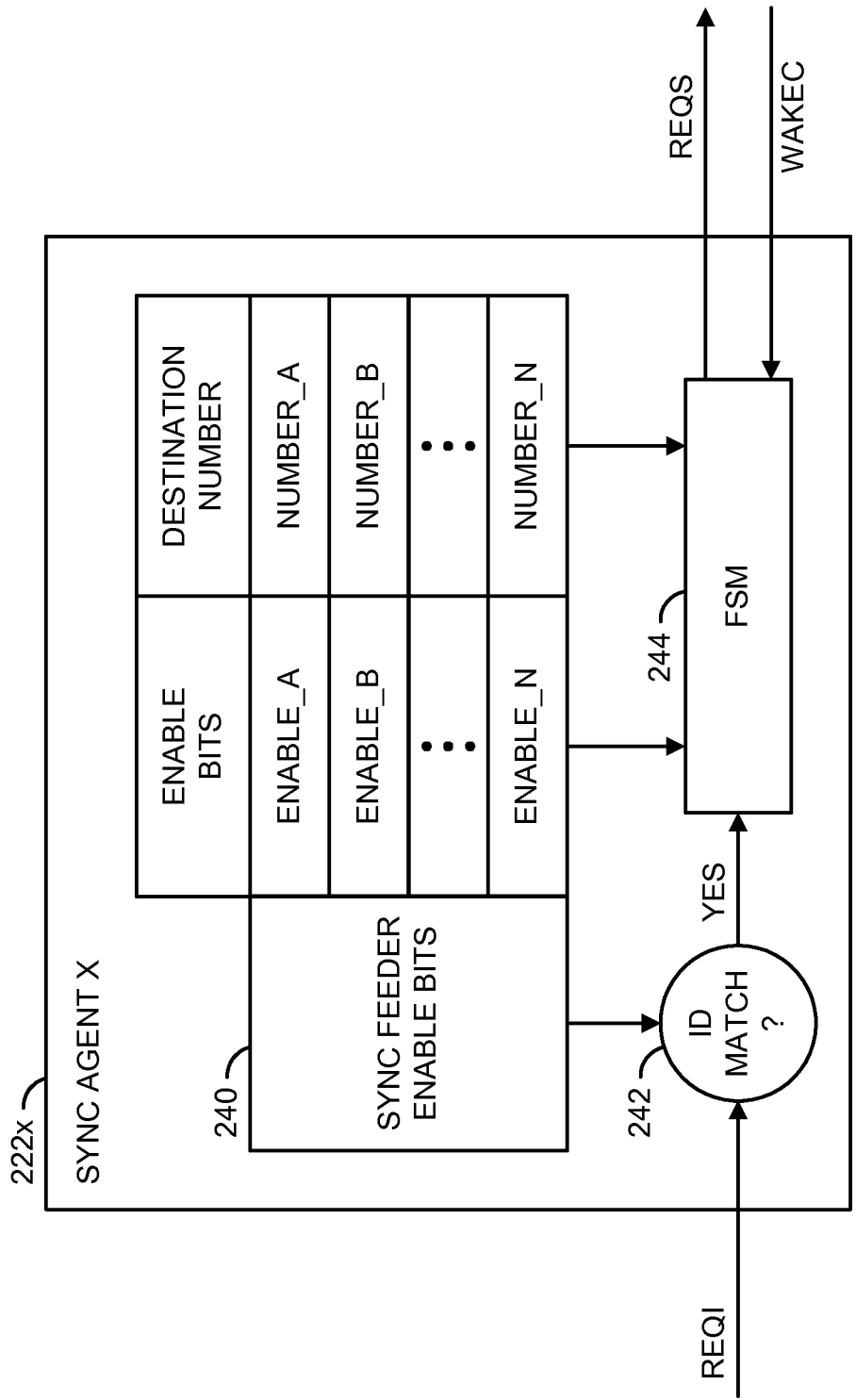
FIG. 8 is a block diagram of a synchronization agent.

Referring to FIG. 8, a block diagram of an example implementation of a circuit 222x is shown. The circuit 222x may be representative of each circuit 222a-222n. One or more registers 240 may store configuration information for the circuit 222x. The configuration information may include, but is not limited to, synchronization enable bits, synchronization counter enable bits (e.g., ENABLE_A to ENABLE_N) and destination synchronization counter numbers (e.g., NUMBER_A to NUMBER_N).

Setting a synchronization enable bit to an enable state (e.g., a logical one state) generally enables the circuit 222x to perform an initial snoop for an increment-wait request, perform multiple initial increment-wait requests, and perform subsequent increment-wait requests. Setting the synchronization enable bit to a disabled state (e.g., a logical zero) generally disables the circuit 222x (e.g., the sync virtualization agent may be inactive or unused). The disabled state may be a default state of each circuit 222x after a system reset or power-on or power-off.

Since one or more of the circuits 222a-222n may be used to synchronize multiple (various) streams/pipeline sections (e.g., increment multiple sync counters), the synchronization counter enable bits ENABLE_A to ENABLE_N may control the number of streams (e.g., the circuits 146a-146n and 148) that the circuit 222x may synchronize for the particular application/operating mode. The destination numbers (or fields) NUMBER_A to NUMBER_N may identify the synchronization counter circuits 162a-162n that the circuit 222x may control (e.g., increment). The destination numbers NUMBER_A to NUMBER_N may store the synchronization counter numbers used by the input streams that share/receive the same data stream from the producer pipeline 146a. Setting a synchronization counter enable bit ENABLE_A to ENABLE_N to an active state (e.g., the logical one state) generally means that the circuit 222x may increment the synchronization counter number specified (or programmed) in the corresponding NUMBER_A to NUMBER_N field. Setting the synchronization counter enable bit ENABLE_A to ENABLE_N to an inactive state (e.g., the logical zero state) generally means that the circuit 222x may disregard (or ignore) the corresponding NUMBER_A to NUMBER_N field. For example, setting bit ENABLE_A to active may enable the circuit 222x to perform the increment-wait operation on a particular synchronization counter circuit 162a-162n having an identification number specified in the NUMBER_A field. Setting the bit ENABLE_A to inactive generally disables the circuit 222x from performing any increment-wait operation on the particular synchronization counter circuit 162a-162n having the identification number specified in the NUMBER_A field.

A comparison circuit 242 may compare the incoming requests in the signal REQI with the identification (e.g., ID) number of the circuit 222x. If an identification number in a request does not match the enabled identification number of the circuit 222x, the request may be ignored by the circuit 222x. If the identification number in a request matches the enabled identification number of the circuit 222x, the request is intended for the circuit 222x and may be acted upon. Hence, a finite state machine (e.g., FSM) 244 may send the one or more increment-wait requests in the signal REQS. The increment-wait requests may be directed to one or more enabled target circuits 162a-162n. The finite state machine 244 may also collect the wake instructions received in the signal WAKEC from the circuit 142 and generate the single wake instruction back to the producer pipeline 146a.

The input streams may be synchronized to the output streams at synchronization boundaries (e.g., at every synchronization unit worth of data). Therefore, the circuit 222x generally prevents any buffer underflow and/or overflow issues. Moreover, the circuit 222x generally allows the multiple input streams that receive the data from the single output stream to operate with different skews with respect to each other. The maximum allowed skew may be changed, depending on the application criteria, by adjusting the shared elasticity buffer size. An array of the circuits 222a-222n may be implemented to support multiple output streams feeding multiple input streams simultaneously. Each circuit 222a-222n may be reprogrammed and controlled independently of each other.

Figure 9:
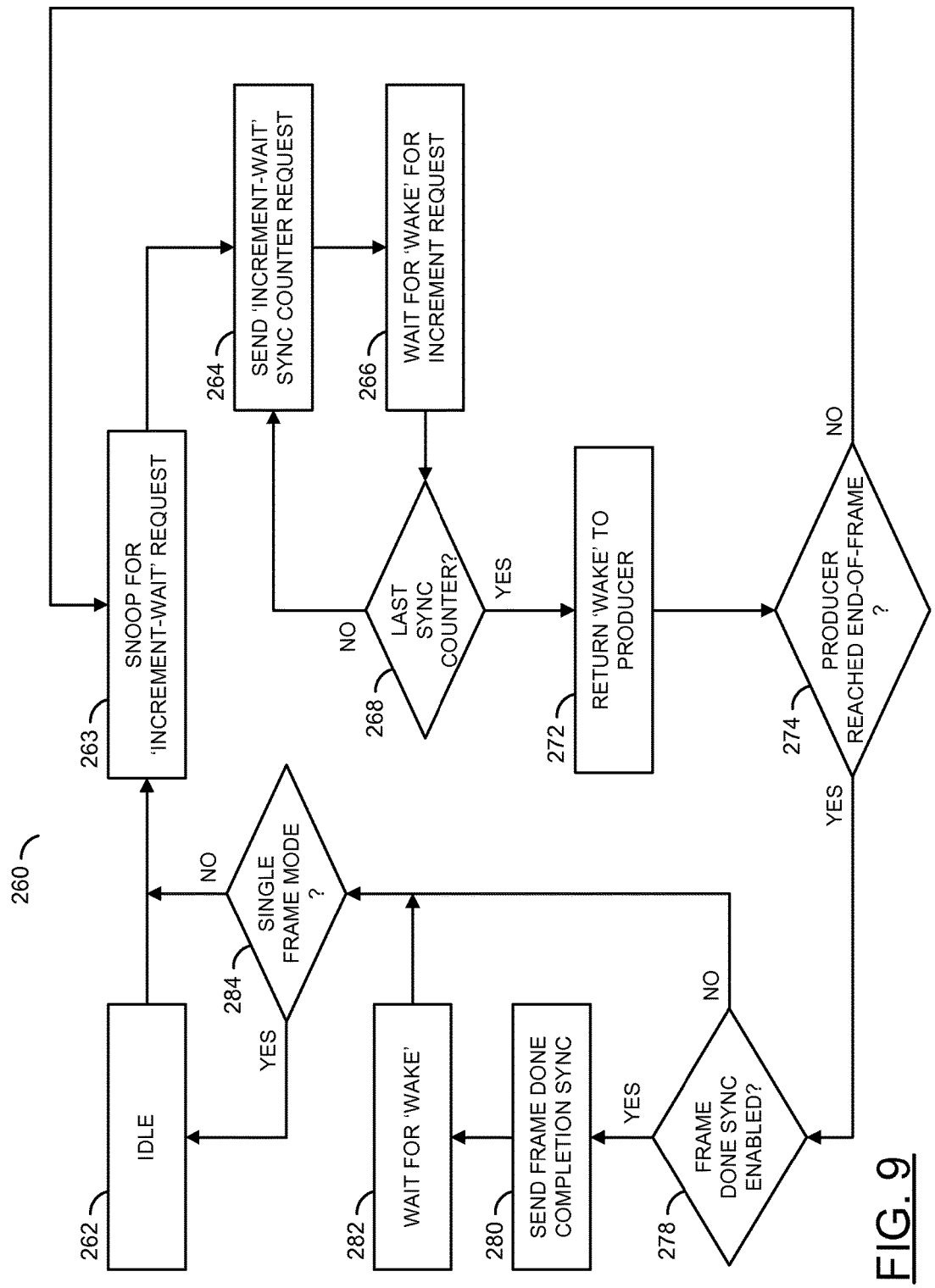
FIG. 9 is a flow diagram of sequence of operations in the synchronization agent.

Referring to FIG. 9, a flow diagram of an example sequence of operations 260 in the circuit 200 is shown. The sequence (or method or process) 260 generally comprises a step (or state) 262, a step (or state) 263, a step (or state) 264, a step (or state) 266, a decision step (or state) 268, a step (or state) 272, a decision step (or state) 274, a decision step (or state) 278, a step (or state) 280, a step (or state) 282 and a decision step (or state) 284. The steps 262-284 may be implemented in hardware, software, firmware or any combination thereof in an apparatus (or device).

Each receiving pipeline 146a-146n and 148 may generate a receive-wait request for the respective circuits 162a-162n and wait for the corresponding wake instruction to be returned from the circuit 142. Each circuit 222a-222n generally begins in an idle state in the step 262. Upon initialization or receipt of a new command, a selected circuit (e.g., 222a) of the circuits 222a-222n may begin snooping the bus 144 in search of an increment-wait requests in the step 263.

Upon detecting an increment-wait request from the producer pipeline 146a, the selected circuit 222a may issue the increment-wait request for a target circuit (e.g., 162b) in the step 264. The increment-wait request generally increments the counter value of the target circuit 162b. In the step 266, the selected circuit 222a may wait for the target circuit 162b to respond to the increment request with the wake instruction.

Once the target circuit 162b issues the wake instruction, the selected circuit 222a may check for a last of the counters in the decision step 268. If the current target counter is not the last of the enabled target counters 162b-162n, the method 260 may return to the step 264 and issue another increment-wait request for a next counter (e.g., circuit 162c). The loop around the steps 264, 266 and 268 may continue for each target circuit 162b-162n enabled in the selected circuit 222a. The circuit 222a may subsequently issue a wake instruction back to the producer pipeline 146a in the step 272.

As the target counters 162a-162n receive the increment-wake requests, the target counters 162a-162n may issue wake instructions to the pipelines 146a-146n and 148 that sent the earlier receive-wait requests. Once the circuit 142 responds to the receive-wait requests, the target pipelines 146a-146n and 148 generally start processing an initial unit of data from the circuit 140. Each consuming pipeline 146b-146n and 148 may generate a decrement request after consuming the current buffered data unit and generate a receive-wait request before starting to work on the next buffered data unit.

In the decision step 274, the selected circuit 222a may check if the producer pipeline 146a has reached an end-of-frame (e.g., EOF). If not, the selected circuit 222a may return to the step 263 and snoop for a next increment-wait request. When a next increment-request is detected in the step 263, the steps 264-268 may be processed. In the step 272, a next wake instruction may returned to the producer pipeline 146a in response to the latest increment-wait request generated by the producer pipeline 146. Upon receiving the wake instructions issued by the circuits 162b-162n in response to the receive-wait requests, the target pipelines 146b-146n generally start processing the next data unit.

The steps 263-274 may be repeated until the producer pipelines 146a signals an end-of-frame notification. The selected circuit 222a may respond to the end-of-frame notification by checking for an enabled frame done synchronization flag in the decision step 278. If the frame done synchronization flag is configured as disabled, the method 260 may move to the step 284 to check for a single frame mode. If the frame done synchronization flag is configured as enabled, the selected circuit 222a may send a frame done completion synchronization instruction to the software in the step 280. In the step 282, the selected circuit 222a may wait for another wake instruction. Once the wake instruction has been received, the method 260 may check for the single frame mode in the step 284. Where the circuit 200 is configured in the single frame mode, the method 260 may return to the step 262 and wait for a next command to start processing a next frame. Where the circuit 200 is configured in a multi-frame mode, the method may return to the step 263 to continue snooping for the next increment-wait request. The method 260 may be implemented independently in each circuit 222a-222n.

The circuit 200 may be configured either to process a single video frame or multiple video frames with a single configuration command (or instruction). The circuit 200 may also be configured to process a next frame ahead of time (e.g., while a current frame is being progress). The circuit 200 may buffer the new configuration command until processing of the current frame ends. The new command/configuration generally takes effect once the circuit 200 completes a final synchronization counter operation for the current frame. The command buffering may free an embedded CPU in the circuit 102 from keeping precise track of the progress on the current frame, and issue the next command in a timely manner to process the next frame without causing pipeline bubbles or back-pressure. The command/programming interface defined in the method 260 may work with many types of embedded central processor unit (e.g., CPU) to coprocessor interfaces.

Figure 10:
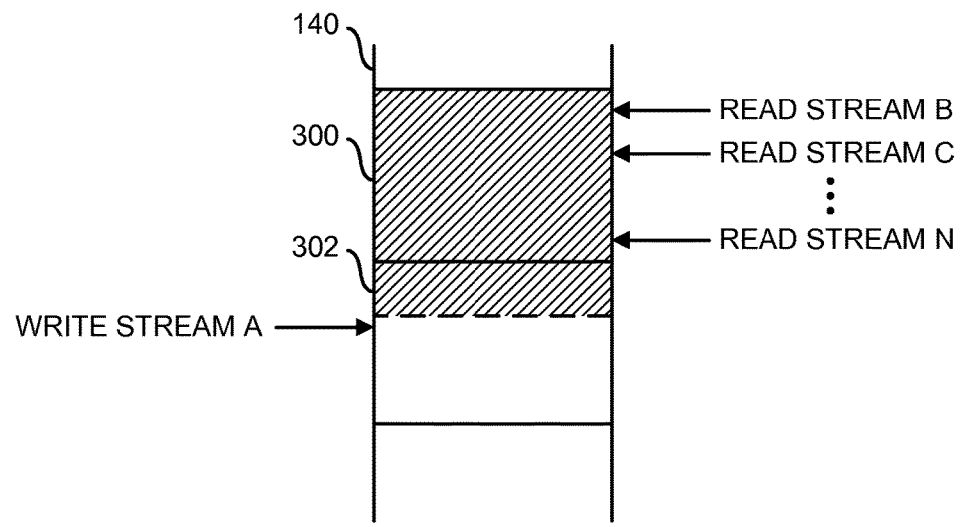
FIG. 10 is a diagram of an output stream feeding multiple input streams with less than a unit of skew across the input streams.

Referring to FIG. 10, a diagram of an example output stream feeding multiple input streams with less than a unit of skew across the input streams is shown. The producing pipeline 146a may have previously generated a data unit 300 in an output stream. The data unit 300 may be stored in the circuit 140. Several input streams (e.g., READ STREAM B to READ STREAM N) may be concurrently reading the data unit 300 from the circuit 140. The input streams READ STREAM B to READ STREAM N may have a skew among each other that is less than the size of the data unit 300. While the data unit 300 is being read by the consumer pipelines 146b-146n, the producer pipeline 146a may be generating a next data unit 302 in a new write stream (e.g., WRITE STREAM A). The data unit 302 may be written simultaneously into the circuit 140 while the data unit 300 is being read from the circuit 140.

Figure 11:
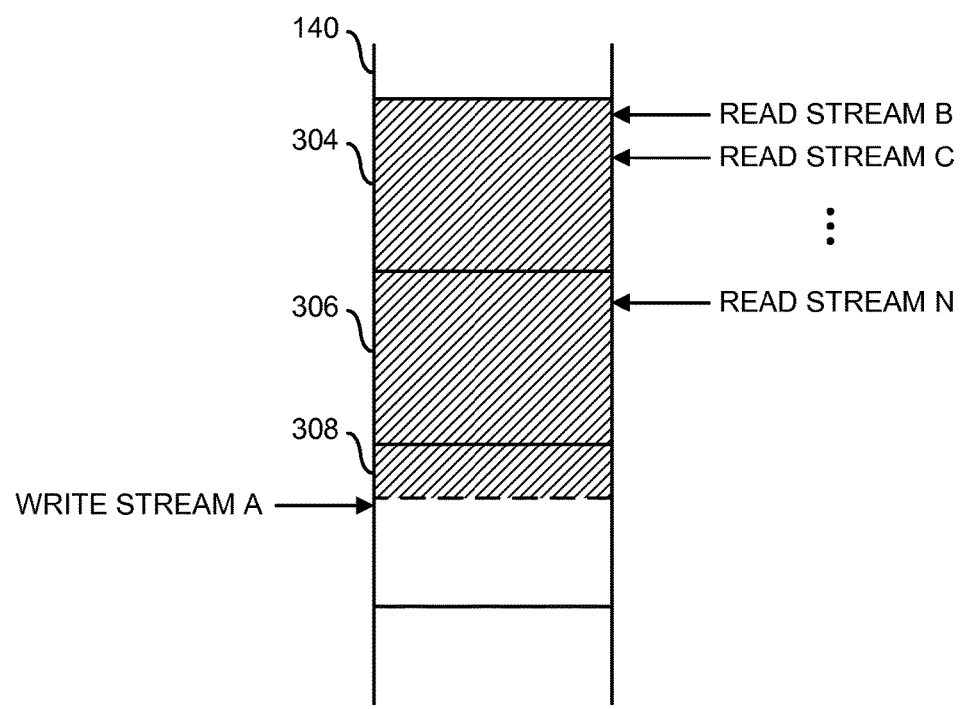
FIG. 11 is a diagram of an output stream feeding multiple input streams with up to two units of skew across the input streams.

Referring to FIG. 11, a diagram of an example output stream feeding multiple input streams with up to two units of skew across the input streams is shown. The producer pipeline 146a may have previously generated data units 304 and 306 in an output stream. The data units 304 and 306 may be stored in the circuit 140. Some input streams READ STREAM B to READ STREAM M may be concurrently reading the data unit 304 from the circuit 140. The input stream READ STREAM N may be reading the data unit 306 from the circuit 140. The input streams READ STREAM B to READ STREAM N may have a skew among each other of up to two data units. For example, the READ STREAM B is at the start of the data unit 304 when the READ STREAM N is at the end of the data unit 306. While the data units 304 and 306 are being read by the consumer pipelines 146b-146n, the producer pipeline 146a may be generating a next data unit 308 in the new write stream WRITE STREAM A. The data unit 308 may be written simultaneously into the circuit 140 while the data units 304 and 306 are being read from the circuit 140.

Various embodiments of the present invention may synchronize all input streams that receive data from a single output stream through a single on-chip buffer to prevent any buffer underfloor and/or overflow situations. An array of synchronization agents may be implemented to support multiple output streams feeding multiple input streams simultaneously and each agent may be reprogrammed and controlled independently. The operation of the agents may be transparent to the pipelines and counters. The pipelines and counters generally operate as if the streams are connected one-to-one through dedicated buffers.

The agents may be configured for either a single video frame mode of operation or a multiple frame mode of operation with a single command (or instruction). Furthermore, a command to reconfigure an agent for a next frame may be issued while a current frame is being processed. The new command is generally buffered in the agent. The new command/configuration may take effect once the agent completes the final counter operation for the current frame.

Embodiments of the present invention may work with existing camera circuitry (e.g., a silicon-on-a-chip circuit), image and video processors, digital camera architectures and digital camera implementations. The synchronization circuit may be transparent to the processor pipeline sections that produce and consume the data units, so no design changes may be implemented to interface to the existing image/video processor pipelines sections, and synchronization counters. Some embodiments of the invention may scale to any number of processor pipeline sections (or input streams) that share a data stream. Each synchronization agent may be completely re-configurable and may be re-mapped to any image pipeline sections of the streams.

Embodiments of the present invention generally operate independent of the other processors to continuously monitor the agents and may not track the image/video frame progress and re-configuration. The agents may report a frame completion through interrupts and/or dedicated frame level synchronization counters to the application software running on the processor.

Some embodiments generally allow the input streams that share data units to run (consume) with varying skews with respect to each other. The maximum amount of skew allowed may be configurable by software based on the application criteria by adjusting the elasticity buffer (e.g., on-chip stream buffer) size.

The functions and structures illustrated in the diagrams of FIGS. 1-11 may be designed, modeled and simulated using one or more of a conventional general purpose processor, digital computer, microprocessor, microcontroller and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example a non-transitory storage media, and may be executed by one or more of the processors. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   a first circuit configured to interface to a bus that sends and receives data to and from a plurality of counters and a plurality of pipelines; and
   a second circuit configured to (i) detect a first request on said bus from a first pipeline of said pipelines to increment one of said counters, (ii) send a plurality of second requests on said bus to said counters to increment each of two or more given counters of said counters associated with a data unit in a buffer in response to said first request, (iii) receive a plurality of wake instructions on said bus from said given counters after sending said second requests, (iv) send another wake instruction on said bus to said first pipeline in response to reception of all of said wake instructions generated by said given counters, (v) snoop said bus in search of said first request while said second circuit is in a single frame mode, (vi) snoop said bus in search of an end of frame and (vii) idle operation in said second circuit in response to detecting said end of frame after said first request is found,
wherein (a) said first pipeline generates said data unit stored in said buffer, (b) a plurality of second pipelines of said pipelines are configured to access said data unit in said buffer in response to said given counters being incremented and (c) each of said given counters are configured to tracks a status of a respective one of said second pipelines.

2. The apparatus according to claim 1, wherein said first circuit and said second circuit are implemented in only hardware.

3. The apparatus according to claim 1, wherein each of said second pipelines are configured to decrement a respective one of said given counters when finished with said data unit in said buffer.

4. The apparatus according to claim 3, wherein said second circuit is further configured to enable said second pipelines to process an additional data unit in said buffer in response to a reception on said bus of an additional request from the first pipeline.

5. The apparatus according to claim 1, wherein said second circuit is further configured to snoop said bus in search of (i) said first request while said second circuit is in a multiple frame mode, (ii) said end of frame and (iii) a next request in response to detecting said end of frame after said first request is found.

6. The apparatus according to claim 1, wherein (i) said data unit generated by said first pipeline and stored in said buffer comprises a number of units, (ii) said number is greater than one and (iii) said second circuit is configured to increase each of said given counters by said number to grant said second pipelines access to said units.

7. The apparatus according to claim 6, wherein at least one of said second pipelines is configured to read from a first of said units while at least another of said second pipelines is configured to read from a second of said units.

8. The apparatus according to claim 1, wherein said first and said second circuit are part of a digital camera.

9. A method for data unit synchronization between pipelines, comprising the steps of:
interfacing to a bus that sends and receives data to and from a plurality of counters and a plurality of pipelines;
detecting a first request on said bus from a first pipeline of said pipelines to increment one of said counters;
sending a plurality of second requests on said bus to said counters to increment each of two or more given counters of said counters associated with a data unit in a buffer in response to said first request, wherein (a) said first pipeline generates said data unit stored in said buffer, (b) a plurality of second pipelines of said pipelines are configured to access said data in said buffer in response to said given counters being incremented and (c) each of said given counters are configured to track a status of a respective one of said second pipelines;
receiving at a circuit a plurality of wake instructions on said bus from said given counters after sending said second requests;
sending another wake instruction on said bus to said first pipeline in response to reception of all of said wake instructions generated by said given counters;
snooping said bus in search of said first request while said circuit is in a single frame mode;
snooping said bus in search of an end of frame; and
idling operation in said circuit in response to detecting said end of frame after said first request is found.

10. The method according to claim 9, wherein said circuit is implemented in only hardware.

11. The method according to claim 9, wherein each of said second pipelines is configured to decrement a respective one of said given counters when finished with said data unit in said buffer.

12. The method according to claim 11, further comprising the step of:
enabling said second pipelines to process an additional data unit in said buffer in response to reception on said bus at said circuit of an additional request from the first pipeline.

13. The method according to claim 9, further comprising the steps of:
snooping said bus in search of said first request while said circuit is in a multiple frame mode;
snooping said bus in search of an end of frame; and
snooping said bus in search of a next request in response to detecting said end of a frame after said first request is found.

14. The method according to claim 9, wherein (i) said data unit generated by said first pipeline and stored in said buffer comprises a number of units, (ii) said number is greater than one and (iii) said circuit is configured to increase each of said given counters by said number to grant said second pipelines access to said units.

15. The method according to claim 14, wherein at least one of said second pipelines is configured to read from a first of said units while at least another of said second pipelines is configured to read from a second of said units.

\* \* \* \* \*